(12) United States Patent
Goren et al.

(10) Patent No.: US 6,317,836 B1
(45) Date of Patent: Nov. 13, 2001

(54) DATA AND ACCESS PROTECTION SYSTEM FOR COMPUTERS

(75) Inventors: Ofer A. Goren, Palo Alto, CA (US); Juan C. Ruival, East Brunswick, NJ (US)

(73) Assignee: TV Objects Limited LLC, Princeton, NJ (US)

( * ) Notice: Subject to any disclaimer, the term of this patent is extended or adjusted under 35 U.S.C. 154(b) by 0 days.

(21) Appl. No.: 09/036,240

(22) Filed: Mar. 6, 1998

(51) Int. Cl.[7] .................................................. H04L 9/32
(52) U.S. Cl. .................................................. 713/200
(58) Field of Search .................................... 713/200, 201, 713/202, 150, 155, 182, 184; 709/203, 227

(56) References Cited

U.S. PATENT DOCUMENTS

| | | | |
|---|---|---|---|
| 4,819,267 | * 4/1989 | Cargile et al. | 380/23 |
| 5,202,997 | 4/1993 | Arato . | |
| 5,212,729 | * 5/1993 | Schafer | 380/4 |
| 5,313,639 | 5/1994 | Chao . | |
| 5,379,344 | * 1/1995 | Larsson et al. | 380/23 |
| 5,475,839 | 12/1995 | Watson et al. . | |
| 5,485,622 | 1/1996 | Yamaki . | |
| 5,515,440 | 5/1996 | Mooney et al. . | |
| 5,594,227 | * 1/1997 | Deo | 235/380 |
| 5,610,981 | 3/1997 | Mooney et al. . | |
| 5,706,426 | * 1/1998 | Hsu | 395/186 |

* cited by examiner

Primary Examiner—Thomas M. Heckler
(74) Attorney, Agent, or Firm—Flanagan & Flanagan; John R. Flanagan; John K. Flanagan

(57) ABSTRACT

The present invention provides for a data and access protection system for a computer via the use of a hardware key, comprising a non-volatile memory for storing a first access code, a hardware key having a second access code, means for determining whether the hardware key is connected to the computer and whether the first access code is different from the second access code, and means for disabling the computer when the hardware key is not connected to the computer or when the first access code is different from the second access code. Additional aspects of the present invention provide that the hardware key is capable of being carried on a key chain on a person and capable of starting a computer through wireless means. A further aspect of the present invention provides that the hardware key can be used to secure electronic transactions conducted over the Internet.

24 Claims, 13 Drawing Sheets

| PIN | REGISTER – BIT # |
|---|---|
| 1 | Control register 0 |
| 2 | Data register 0 |
| 3 | Data register 1 |
| 4 | Data register 2 |
| 5 | Data register 3 |
| 6 | Data register 4 |
| 7 | Data register 5 |
| 8 | Data register 6 |
| 9 | Data register 7 |
| 10 | Status register 6 |
| 11 | Status register 7 |
| 12 | Status register 5 |
| 13 | Status register 4 |
| 14 | Control register 1 |
| 15 | Status register 3 |
| 16 | Control register 2 |
| 17 | Control register 3 |

Figure 5

```
mov dx, [lpt_port]         ; read the parallel port base address into dx

; set control register for bidirectional operation
push dx
add dx, 2h                 ; control register offset at base + 2
mov al, 0ach               ; set control bits 5 & 7 to 1
out dx, al
pop dx ; read from parallel port 13 bit code into bx
in al, dx                  ; get data register at base + 0
mov bl, al                 ; set low half of bx to whatever is in lower half of dongle bits inc dx                     ; set to read higher bits of dongle
in al, dx                  ; get status register at base + 1
and al, 0f8h               ; set bits 0,1,2 to 0 (they have erratic values and aren't used, therefore
                           ; we set them to zero so equality can be easily tested for)
mov bh, al                 ; set upper half of bx to whatever is in upper half of dongle bits ; the dongle test
cmp bx, [serial_number]    ; compare bx with stored serial number
```

Figure 8

DATA AND ACCESS PROTECTION SYSTEM FOR COMPUTERS

BACKGROUND OF THE INVENTION

1. Field of the Invention

The present invention relates generally to a data and access protection system for computers, and more particularly to a system having the capability to control the boot-up operation of a computer in accordance with a hardware key.

2. Description of the Related Art

Computer security has been an important issue ever since the use of computers became widespread. There is obviously a strong need to protect sensitive and confidential information residing on computers, regardless of whether such information is personal or business-related. This issue has become even more acute with the proliferation of portable personal computers or what are commonly known as laptops.

The source of the problem is apparent. Due to the portability and convenience of a laptop, more and more people are carrying their computers with them wherever they go. What that means is that information which used to be accessible from a more secure location, such as a home or an office, has now become more accessible to other parties, who may have an interest in gaining unauthorized access to such information.

Furthermore, the growing popularity of laptops has spawned and accelerated another problem, namely, computer theft. With desktop computers, the primary concern is the adequate protection of information residing on such computers. Theft of desktop computers, of course, does occur. However, in order to steal a desktop computer, the perpetrator very often, if not almost always, has to first break into a home or an office. This prospect alone unquestionably has deterred a lot of would-be perpetrators who were merely interested in stealing a desktop computer.

With laptops, however, there is a more realistic concern with the theft of the computers themselves. Due to the ease of transportation, stealing a laptop is as simple as walking away with a piece of luggage which, in almost all cases, is no bigger than a briefcase. In most instances, it would be safe to assume that people steal laptops for the sake of stealing them per se and not for any information which they may contain.

In any event, the ability to disable a computer and deny any access thereto when it is in the possession of an unauthorized user is important. Many attempts to realize this ability have been implemented in software. These attempts mostly rely on the use of passwords to deny access to any unauthorized user. In addition, a number of methods or technologies have been used to fortify some password schemes including, for example, the use of encryption technology to produce a software-generated key as a password. Unfortunately, software implementation relying on password access suffers from a variety of inherent weaknesses. One of the obvious weaknesses is that any person gaining knowledge of the password can access the computer.

With respect to current electronic commerce being commonly conducted over the Internet, a customer is generally required to open an account by supplying certain personal information including an account password. This scheme does not prevent a person from illegally using another person's account if the password is somehow discovered.

Moreover, this type of access control utilizing a password can often be circumvented by inserting an external boot disk, which may be in the form of a floppy disk or a CD-ROM, into the external drive of the computer to initiate the boot-up operation thereby bypassing the password protection and allowing access to the hard drive. Alternatively, many software designers have successfully created computer programs which are specifically designed to defeat password protected systems.

Furthermore, a lot of password protection schemes can be defeated by brute force. This is because a password protection scheme generally allows a user to select and modify his or her own password. In order to allow for such flexibility, a CMOS memory is usually used. However, a CMOS memory is susceptible to simple tampering. A CMOS memory is powered by an internal battery and serves to store any password information supplied by the user. If the internal battery is disconnected, the contents of the CMOS memory, including the password information stored by the user, will be erased thereby effectively gaining access to the protected computer.

Hence, to effectively control access to a computer, a hardware component is desirable without the use of a password. The use of a hardware component to control access has a number of advantages. When a hardware component is used, the access control may be achieved before the operating system is loaded and initiated thereby preventing access to the hard drive.

Furthermore, the use of a hardware component eliminates the need to memorize a password. With the proliferation of various online and computer services, it is not uncommon for an individual to have a number of different accounts with various service providers. Thus, if different passwords are to be used for different accounts, the possibility of forgetting and confusing passwords is quite real.

While it is possible for an individual to try to use the same password for all his or her accounts, this approach can only provide short-term relief. For security purposes, most passwords have a predefined expiration date, and consequently, users are often required to modify their passwords periodically. Since different passwords on different accounts are likely to expire on different dates, an individual will eventually have to deal with the situation of having the need to memorize a number of different passwords.

Prior art hardware based protection schemes, nonetheless, continue to have a few shortcomings. In general, these hardware based protection schemes require a hardware component which is complex and specialized. While these complex and specialized hardware component are warranted in the protection of highly sensitive and confidential information, such level of security is neither required nor desired by the majority of computer owners.

Moreover, these schemes generally involve implementation of complex circuitry and other devices within the hardware component. The use of such circuitry and devices has a couple of disadvantages. First, they are generally delicate and susceptible to physical abuse; second, they are often sizable and bulky thus requiring their integration into the computer. Therefore, due to the size and the lack of sturdiness of such circuitry, the hardware component is generally not suited for carrying on a person.

Furthermore, as a result of the use of such complex and specialized circuitry, the cost of implementing a hardware based protection scheme is relatively high.

SUMMARY OF THE INVENTION

It is accordingly an object of the present invention to provide a data and access protection system for a computer, having a scheme for controlling the boot-up operation of a computer in accordance with a hardware key.

It is another object of the present invention to provide a data and access protection system for a computer without the use of a password.

The present invention provides for a data and access protection system for a computer via the use of a hardware key, comprising a non-volatile memory for storing a first access code, a hardware key having a second access code, means for determining whether the hardware key is connected to the computer and whether the first access code matches the second access code, and means for disabling the computer when the hardware key is not connected to the computer or when the first access code does not match the second access code.

In another aspect of the present invention, the hardware key, in conjunction with an electronic circuit with storage capacity, is used to generate a more complicated second access code to provide further security for the system.

When the computer is initially powered on, the software routines stored in the basic input/output system (BIOS) read-only memory (ROM) are executed. Prior to transferring control to the operating system, the routines check to determine whether a hardware key is properly inserted into the parallel port of the computer. If the routines detect an absence of a hardware key, the boot-up operation of the computer is halted at that point. If a hardware key is present, the routines then proceed to determine whether the hardware key present in the parallel port is a valid key for accessing the computer. If the hardware key is invalid, the boot-up operation of the computer is halted and access to any information contained in the computer is not possible.

It is a further object of the present invention to provide a system which does not require the utilization of complex and specialized circuitry.

It is yet another object of the present invention to provide a system which is inexpensive and yet effective against unauthorized access.

It is yet another further object of the present invention to provide a system wherein the hardware key is capable of being carried on a key chain on a person.

According to an additional aspect of the present invention, the system provides for a hardware key which can be implemented using a multi-pin connector. This particular implementation does not require the use of complex and specialized circuitry and is inexpensive and yet effective against unauthorized access. Further, due to the compact size of a multi-pin connector, the hardware key is capable of being carried on a key chain on a person.

It is another object of the present invention to provide a system wherein the hardware key is capable of starting a computer through wireless means.

According to another aspect of the present invention, a RF transmitter is integrated with the hardware key rendering it capable of starting a computer through wireless means similar to those devices commonly used in remote entry and alarm systems for automobiles.

It is a further object of the present invention to provide a system for controlling and securing access to electronic transactions conducted over the Internet.

According to a further aspect of the present invention, the system is capable of controlling and securing access to electronic transactions conducted over the Internet. Software routines are installed on the remote computer hosting the Internet website. These routines similarly check for the presence of a valid hardware key in the parallel port of the client computer. If the hardware key is valid, the user is then permitted to access the particular account at that website.

The preceding and other features and advantages of the present invention will be described by way of the following examples taken in conjunction with the figures provided below.

BRIEF DESCRIPTION OF THE DRAWINGS

FIG. 5 is a table showing the register bits of a parallel port.

FIG. 8 is a sample software implementation of the device-driver.

DETAILED DESCRIPTION OF THE PREFERRED EMBODIMENTS

Figure 1:
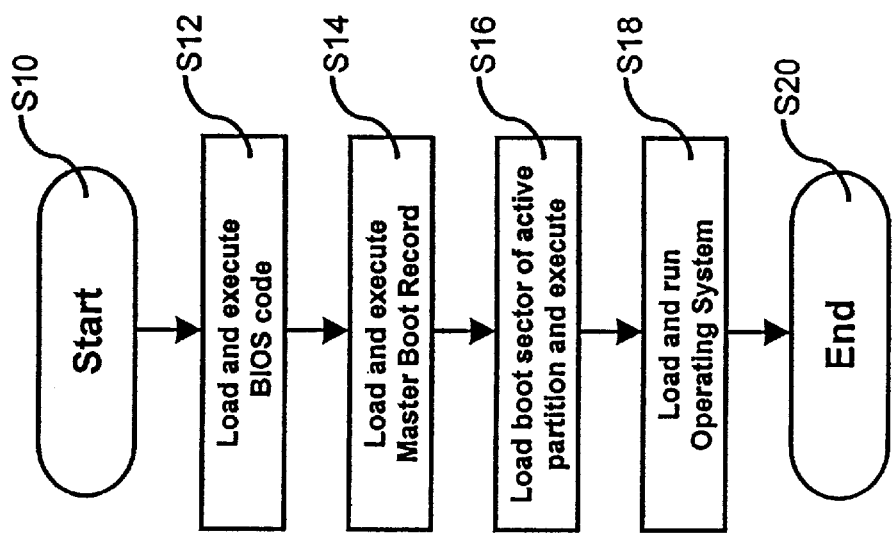
FIG. 1 is a flowchart illustrating the standard boot-up operation of an Intel-based computer.

The preferred embodiment of the present invention will be described with reference to the above drawings. In order to describe and help comprehend the usefulness and value of the present invention, the typical boot-up procedure of an Intel-based computer needs to be understood. FIG. 1 is a flow chart illustrating such boot-up procedure.

When an Intel-based computer is turned on (S10), the basic I/O system (BIOS) programs stored in the read-only memory (ROM) 34 chip are executed first (S12). The first of a number of tasks which the BIOS programs 34 perform during the boot-up procedure is what is commonly known as the Power-On-Self-Test routine or POST. The main function of the POST routine is to detect hardware errors and ensure that all the hardware connected to the computer, such as the system boards and memory, the expansion boards, the keyboard, disk drives, and monitor etc., are functioning properly.

The last task the BIOS 34 performs (S14) is to load either the boot sector from the external drive (usually designated as the a:\or b:\drive) or the master boot record (MBR) from the hard drive (usually designated as the c:\drive). The order of the drives in which the computer attempts to boot from is user-definable within the CMOS setup program. Most computers are set up to attempt to boot from the a:\drive initially, and if there is no boot disk in that drive, another attempt is made to load the MBR from the c:\drive.

The MBR is one (1) sector in size (512 bytes). In an exemplary embodiment, it is located on the hard drive at Head 0, Cylinder 0, Sector 1. The MBR contains instructions beginning with the first byte (byte #0) and ending with the 445$^{th}$ byte. The next sixty-four (64) bytes beginning with byte #446 constitute the partition entry table (PET). The PET contains information on the available partitions and the locations of their respective boot sectors. The last two (2) bytes of the MBR make up the MBR signature, whose values are 55 hexadecimal and AA hexadecimal respectively.

The BIOS 34 finds the MBR and loads it into memory at the address 0:7c00h and execute the MBR code. The MBR code determines the active partition, loads its corresponding boot sector, which contains the operating system boot code, and executes it (S16). Execution of the boot sector of the active partition causes the operating system that is installed in that particular partition to load and run (S18). Once the operating system is loaded, the programs and data residing on the computer can be accessed.

Figure 2:
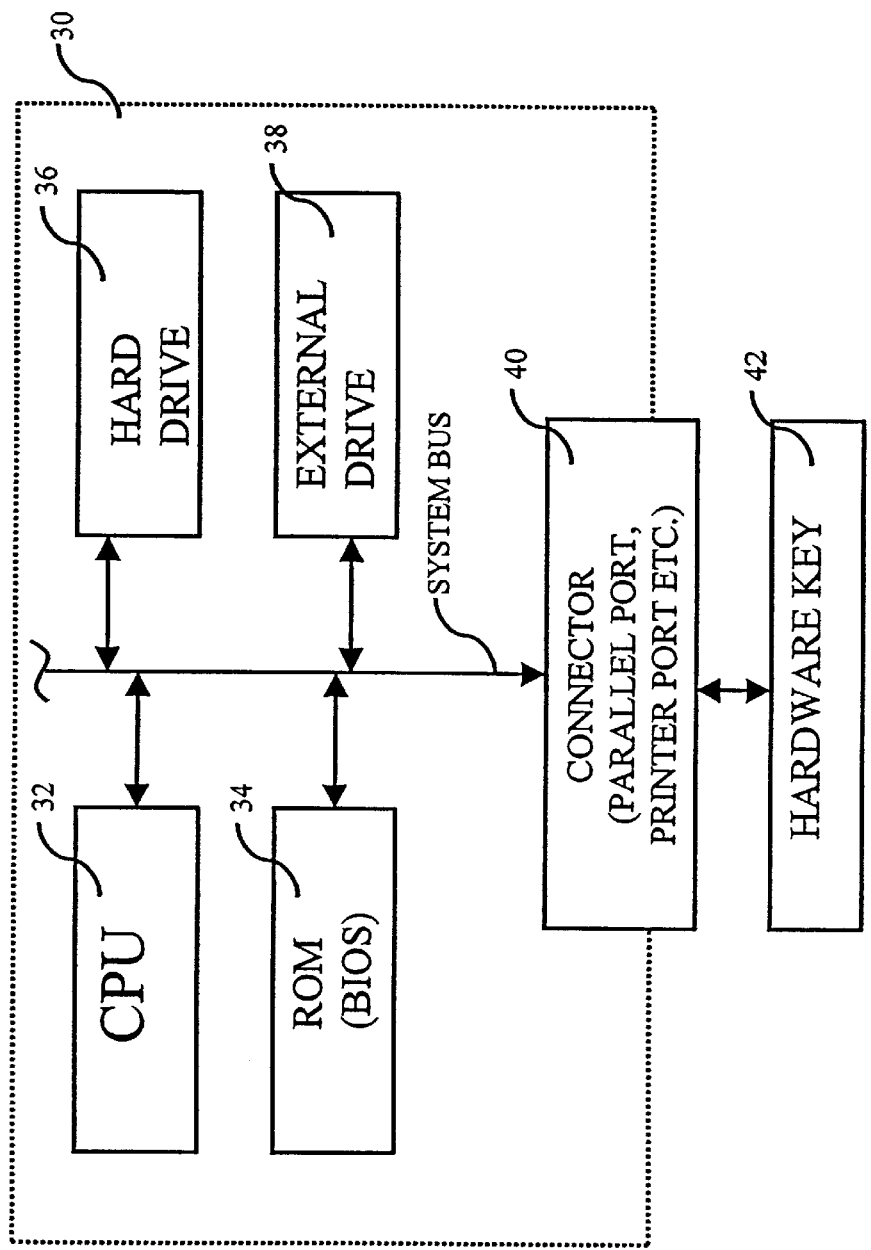
FIG. 2 is a block diagram showing the arrangement of a system according to an embodiment of the present invention.

The present invention is a combination hardware/device-driver based protection against the unauthorized use of a computer and the programs and data stored thereon. FIG. 2 is a block diagram showing the arrangement of a system according to an embodiment of the present invention. The present invention has two main components: a hardware component (known as a hardware key or dongle) 42 and a software component (known as a device-driver) that resides on the hard drive 36 and contains, among other things, the access or identification code of the specific corresponding hardware key 42.

Figure 3:
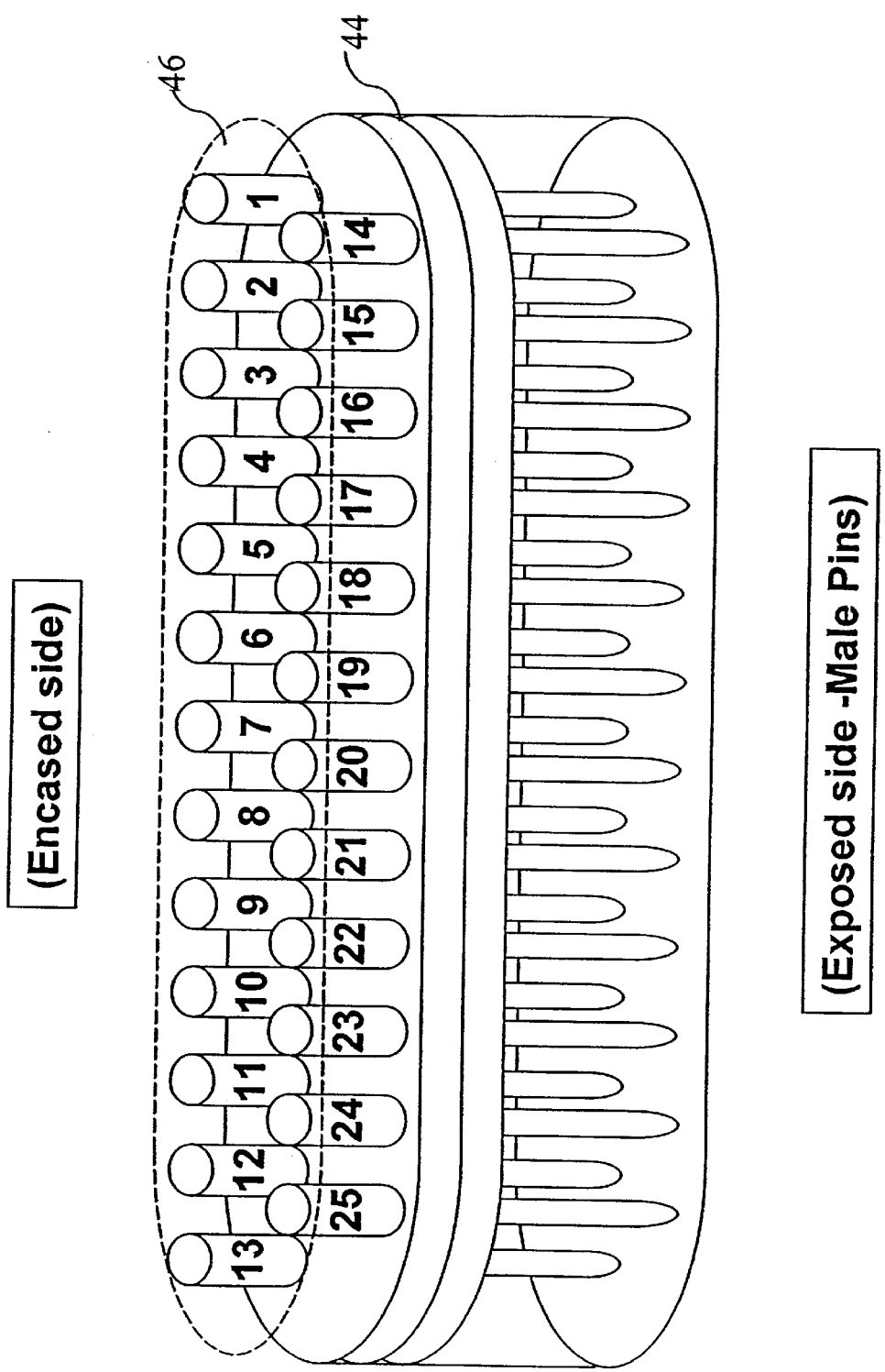
FIG. 3 is a perspective cross-sectional view of the DB25 male connector.

According to the present embodiment, the hardware key 42 may be implemented using a DB25 male connector 44. FIG. 3 is a perspective cross-sectional view of the DB25 male connector 44. The hardware key 42 contains a specific identification code. A number of commonly known wiring schemes may be used to encode such identification code for each particular hardware key 42.

Under the present embodiment, the specific identification code is constructed as follows. The hardware key 42 consists of twenty-five (25) pins 46, numbered 1 through 25, and is prepared as a specific device. Seven (7) of its pins are used as a ground (pins 18–22, 24 and 25) (the "grounding" pins), and thirteen (13) of its pins (pins 2–13, 15) (the "non-grounding" pins) may be used to construct its identification code. Any or all of the thirteen (13) pins can be connected to the grounding pins in any one of 8192 possible combinations, resulting in a total of 8191 different identification codes. The combination with none of the thirteen (13) pins being connected to the grounding pins is not valid, since this is the same as not having a hardware key 42 inserted into the parallel port 40. The non-grounding pins correspond to a specific bit in the data or status register of the parallel port 40. When a non-grounding pin is connected to a grounding pin, the corresponding bit in the data or status register of the parallel port 40 will be set when the hardware key 42 is inserted into the parallel port 40. The device-driver queries the parallel port 40 for the specific identification code of the hardware key 42 by reading the registers of the parallel port 40.

Figure 4:
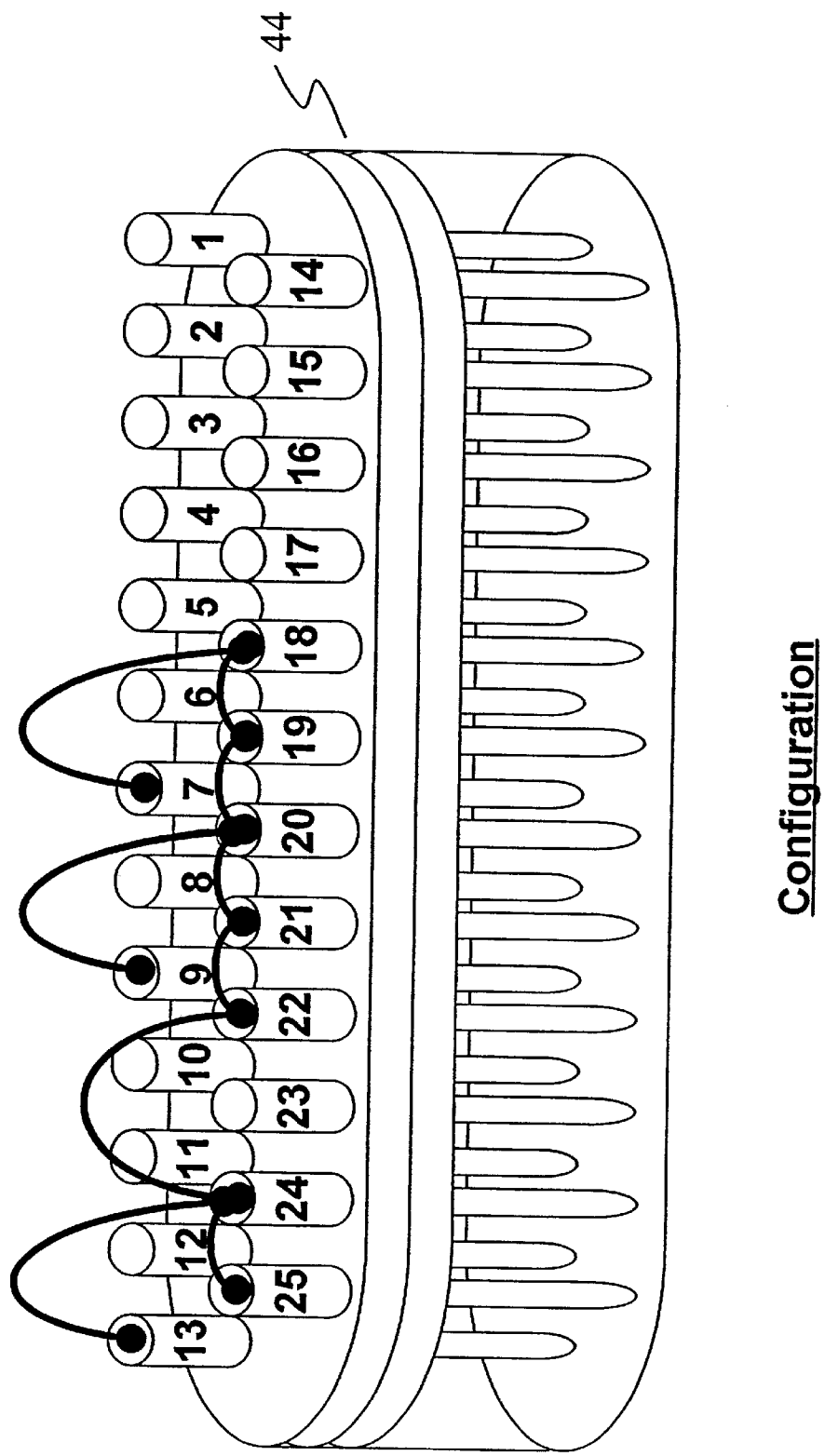
FIG. 4 is an example of the pin connections of the hardware key.

In addition, the remaining four pins (pins 1, 14, 16 and 17) may be used to increase the number of possible combinations. The four (4) remaining pins correspond to bits in the control register of the parallel port 40. Similarly, any or all of the four (4) pins can be connected to the grounding pins, and in conjunction with the other thirteen (13) non-grounding pins, will result in a total of $2^{17}$ (131072) possible combinations. FIG. 4 is an example of the pin connections of the DB25 male connector 44 with pin #7, 9, and 13 connected to the grounding pins. FIG. 5 is a table showing the register bits that can be set by each non-grounding pin when connected to a grounding pin.

In order to gain access to the computer 30, the hardware key 42 will have to be connected to the parallel port (or printer port) 40 of an Intel-based computer 30 prior to turning the computer 30 on and remain connected during the boot-up procedure. The hardware key 42 is inserted in the twenty-five (25) pin female connector (parallel port or printer port) 40 on an Intel-based computer 30. In other embodiments, the hardware key 42 may be connected to a serial port, a mouse port, or a joystick port.

Furthermore, since the hardware key 42 as implemented using the DB25 connector 44 is compact and sturdy, it can be modified to fit on a key chain for carrying on a person, which reduces the likelihood of it being forgotten or misplaced.

Figure 6:
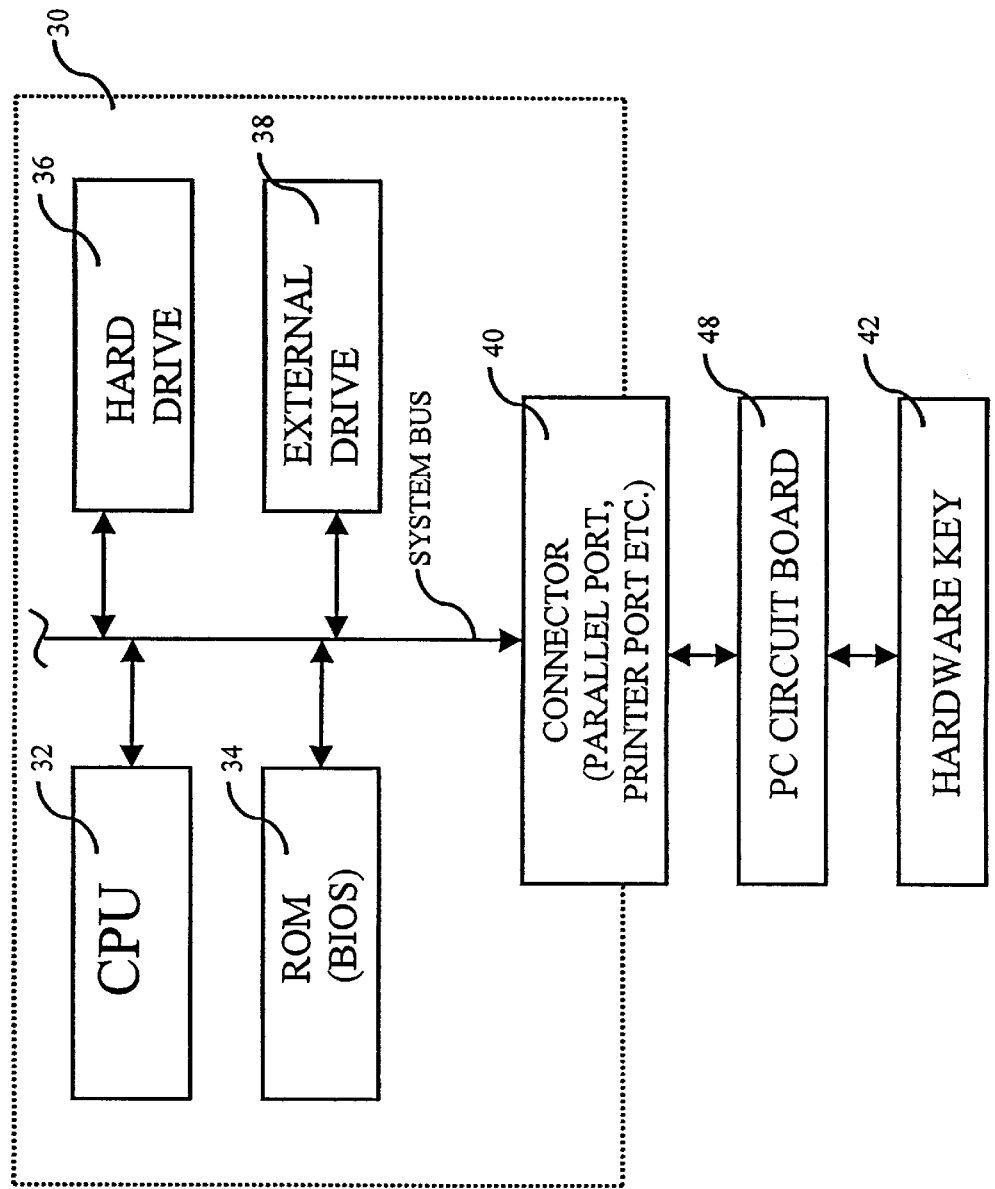
FIG. 6 is a block diagram showing the arrangement of a system as shown in FIG. 2 with the addition of a PC circuit board.

According to another aspect of the present invention as shown in FIG. 6, the number of possible combinations that can be encoded in the hardware key 42 can be increased by the use of a PC circuit board 48 attached to the parallel port 40 of the computer 30. Such PC circuit board 48 generally contains an application-specific integrated circuit (ASIC) chip and a connector for receiving the hardware key 42. An ASIC chip is a ROM chip containing specific instructions and data. Under the present application, the data stored on the ASIC chip is a 64-bit identification code. Alternatively, an ASIC chip with a 128-bit number may be used. Since the code is 64 bit in length, the ASIC is then capable of generating at least $2^{64}$ different numbers thereby increasing the number of identification codes which can be encoded with the hardware key 42.

The specific instructions stored in the ASIC chip can only be executed when the correct hardware key 42 is connected to the PC circuit board 48. Only the 8-bit data register of the parallel port 40 is being used in this exemplary implementation. The device-driver needs to query the parallel port 40 eight (8) times sequentially to extract the 64-bit identification code. Each time the parallel port 40 is queried by the device-driver sequentially with a different value, the ASIC chip in accordance with the hardware key 42 retrieves data stored thereon and sets the data register to one of the possible eight (8) sets of eight (8) bits. The concatenation of the eight (8) sets of eight (8) bits constitute the 64-bit identification code.

Figure 7:
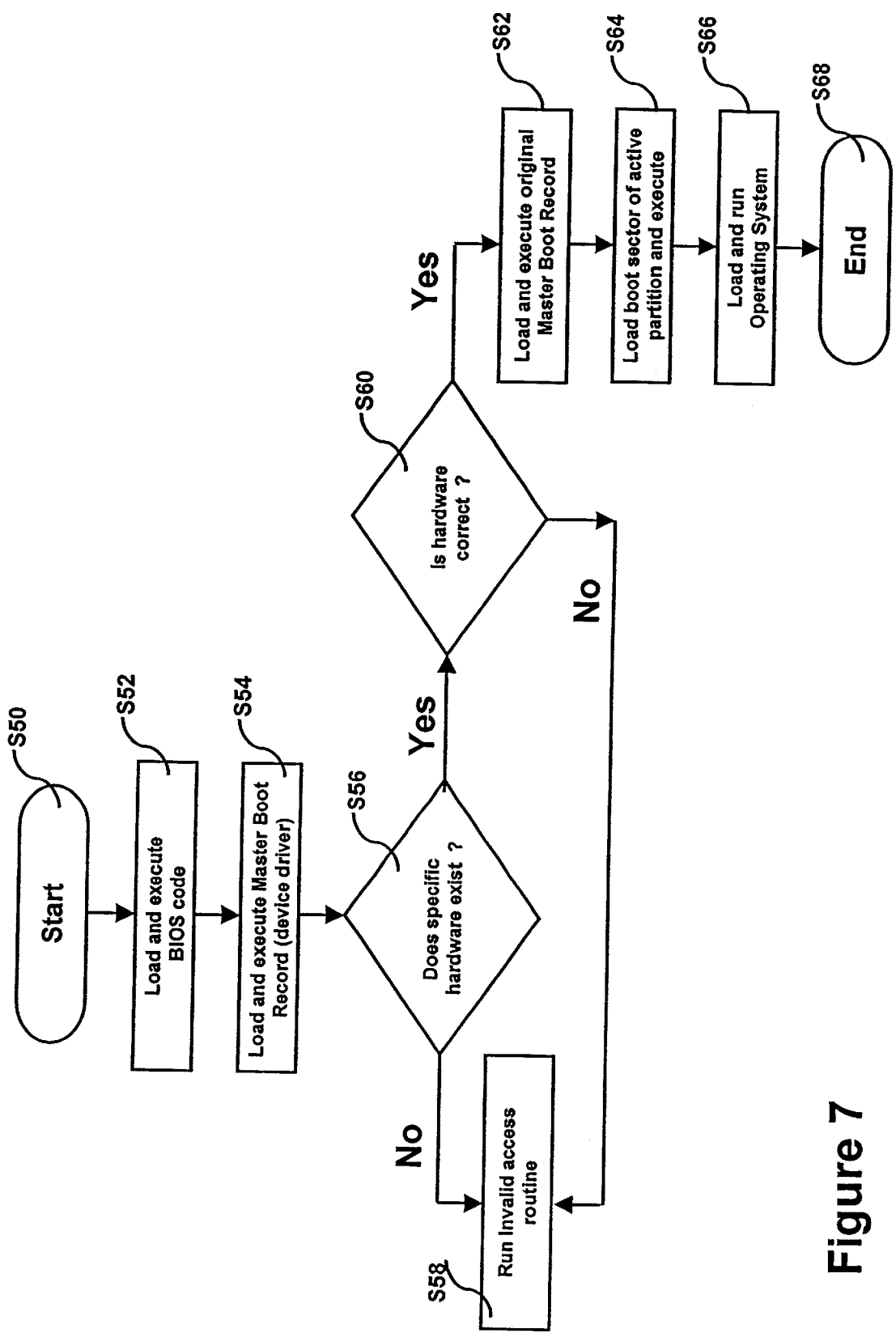
FIG. 7 is a flowchart describing the operation of the present invention.

Under the present invention, the device-driver can either replace or become integrated as part of the MBR. Like the MBR, the device-driver is stored in a hidden sector on the hard drive 36. The device-driver contains the same structure as the original MBR but contains an invalid PET. FIG. 7 is a flowchart describing the operation of the present embodiment. The device-driver is loaded and executed by the BIOS 34 (S52–S54) and is the last section of code to execute prior to the loading and execution of the operating system located in the active partition.

The access validation occurs when the MBR (containing the device-driver) is loaded by the BIOS 34 and executed (S56). FIG. 8 is a sample software implementation of the device-driver for a hardware key 42 with thirteen (13)

non-grounding pins connected. The thirteen (13) non-grounding pins correspondingly set eight (8) bits from the data register and five (5) bits from the status register in the parallel port 40. The control register in the parallel port 40 is not used in the example.

When the computer 30 is powered on, the CPU 32 usually looks to the a:\drive 38 to determine if there is a boot disk. A boot disk can be present in the form of a floppy disk or a CD-ROM. If a boot disk is not available, the CPU 32 will then load the MBR (which contains the device-driver) from the hard drive 36 and execute its code. When executed (S36), the device-driver first checks for the connection of the hardware key 42 to the parallel port 40 of the computer 30. If the hardware key 42 is connected to the computer 30, the device-driver then determines whether the hardware key 42 contains the correct identification code which is specific to the computer 30 (S40). If the device-driver determines that the hardware key 42 contains the correct identification code, then the rest of the code in the MBR continues to execute and the boot-up procedure is completed (S62–S68). If the hardware key 42 does not exist, or exists but has an incorrect identification code, then the boot-up procedure is halted and the programs and data on the computer 30 cannot be accessed (S38).

Figure 9:
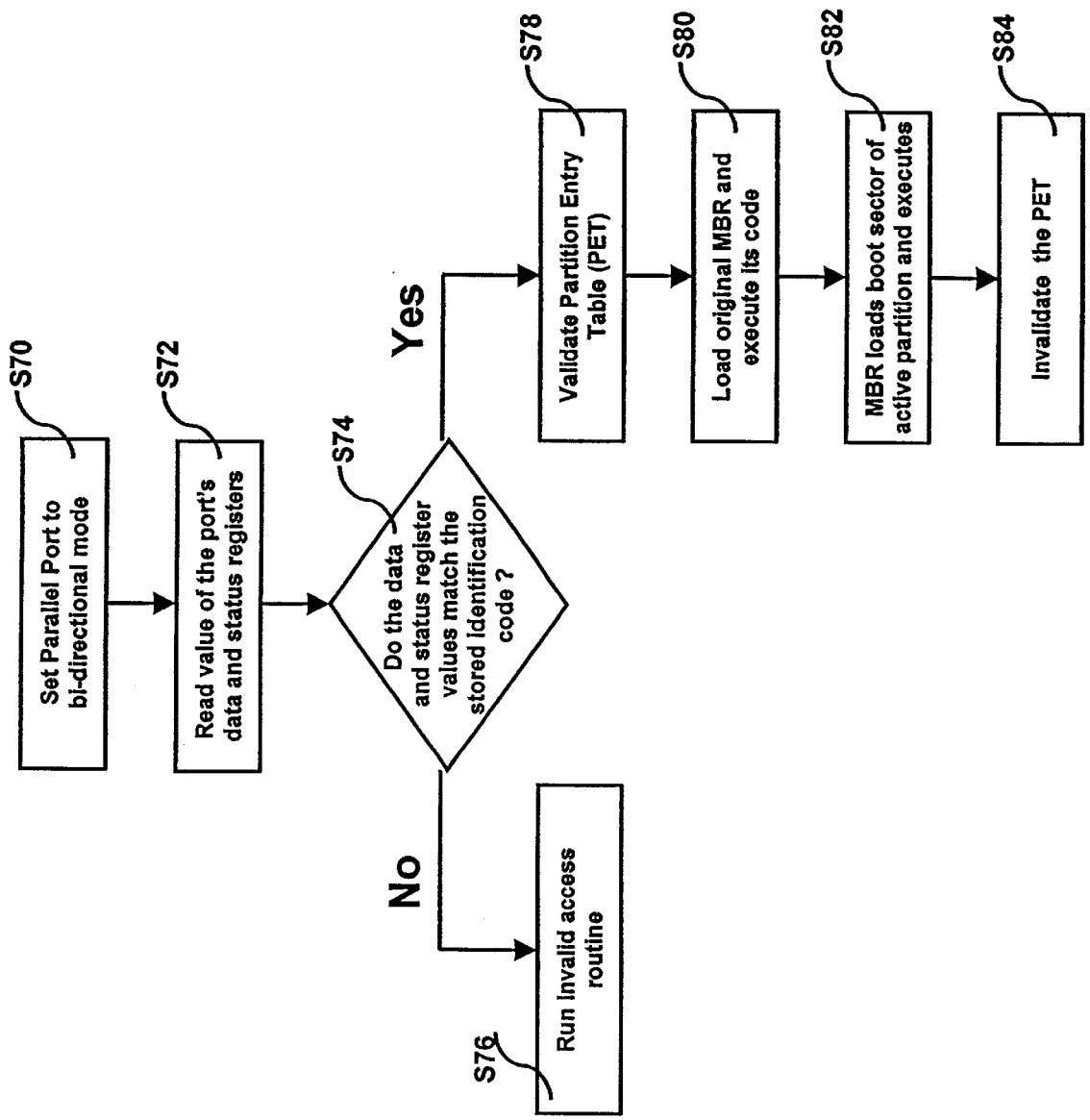
FIG. 9 is a flowchart describing the execution of the device-driver.

FIG. 9 is a flowchart describing in further details the execution of the device driver. During the execution of the device-driver, the CPU 32 first sets the parallel port 40 to bidirectional mode thereby allowing information to be transmitted and received through the parallel port 40 (S50). If there is more than one parallel port 40 on the computer 30, the device-driver will search the port which was used during the installation process. An internal 16-bit register 'bx' is then reserved for storage purposes. The lower and upper 8 bits of the 'bx' register are designated as 'bl' and 'bh' respectively. The CPU 32 then reads the contents of the registers of the parallel port 40 (S52). In particular, the data register of the parallel port 40 is read and its contents are stored in 'bl'. The CPU 32 then retrieves the contents in bits 3–7 of the status register and stores them in 'bh'. The first three (3) bits, bits 0–2, of 'bh' are set to zero (0). The CPU 32 subsequently compares the identification code stored in the device-driver with the contents of the 'bx' register (S54). If the former corresponds to the latter, then the CPU 32 recognizes that the correct hardware key 42 is connected to the parallel port 40 and continues execution of the remaining MBR code (S78–S84). If there is no match, then the CPU 32 discontinues execution of the remaining MBR code and halts the boot-up operation (S76). As mentioned above, depending on the number of non-grounding pins used in the hardware key 42, the contents of the control register in the parallel port 40 may also be examined.

If a valid hardware key 42 exists, the device-driver will perform, among other things, the following functions: (1) validate the PET (S78); (2) load the remaining MBR and execute its code including loading the boot sector in the active partition and executing the boot sector code (S80); and (3) invalidate the PET (S82).

The PET needs to be invalidated to ensure that the computer 30 cannot be booted up without the hardware key 42. The significance of this action is demonstrated as follows. A boot disk used for boot-up purposes, which may be in the form of a floppy disk or a CD-ROM, contains only one (1) partition with a corresponding boot sector and does not have a MBR. When a boot disk is detected in the a:\drive 38, the CPU 32, via the BIOS 34, loads the boot sector on the disk and executes its code. During the execution of the boot sector, the CPU 32 is instructed to read the MBR residing on the hard drive 36 to access the information in the PET. Since the PET is rendered invalid by the previously installed device-driver, the CPU 32 is then not able to recognize the hard drive 36 as a valid drive. This, in effect, prevents any person from accessing the hard drive 36 via booting from an external boot disk.

It is important to note that if the computer 30 does not boot up in accordance with the operation of the present invention, there is effectively no other way to access the hard drive 36 of As the computer 30. Replacing the BIOS 34 will not affect the device-driver which is installed and integrated as part of the MBR. The hard drive 36 will continue to be inaccessible even if it is physically removed from the computer 30 and installed in a different computer. This is because the last action of the BIOS 34 is to load the MBR and execute its code. Without the correct device-driver residing in the MBR and the matching hardware key 42, the hard drive 36 will remain virtually useless.

Figure 10:
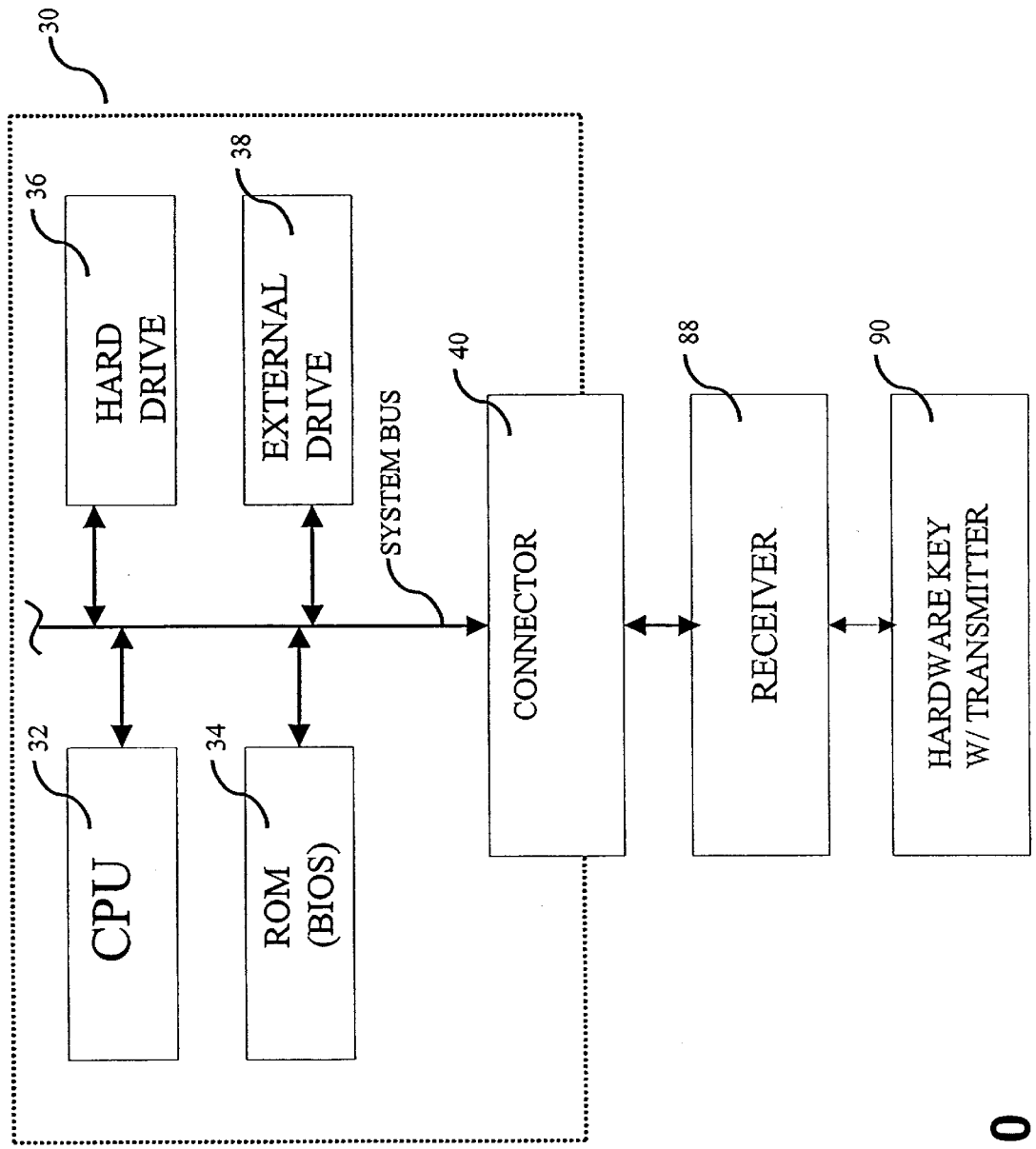
FIG. 10 is a block diagram showing the arrangement of a system as shown in FIG. 2 with the addition of a receiver/transmitter pair.
Figure 11:
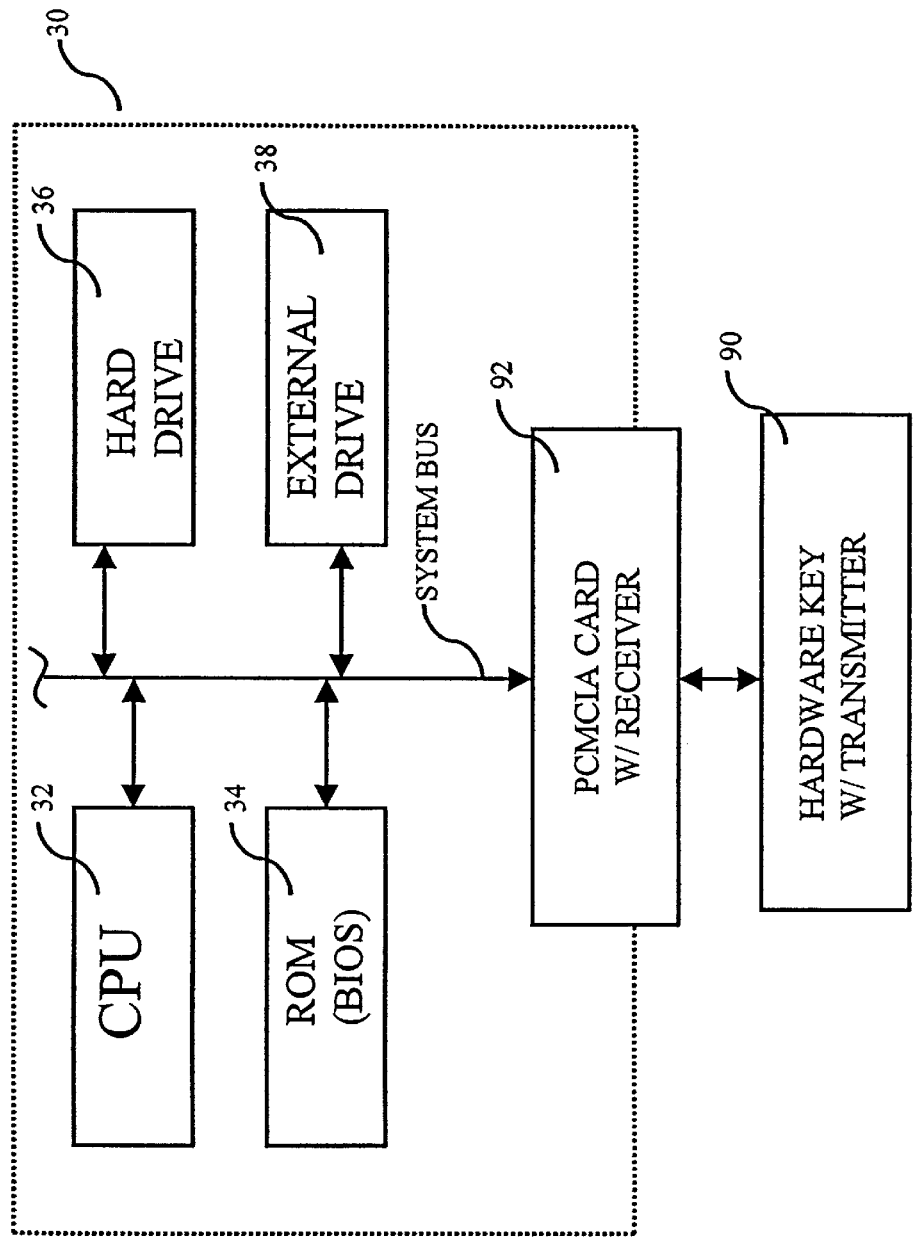
FIG. 11 is a block diagram showing the arrangement of a system as shown in FIG. 2 with the addition of a PCMCIA receiver/transmitter pair.

According to another aspect of the present invention as shown in FIGS. 10 and 11, the hardware key 90 is modified to include a transmitter which is capable of transmitting electromagnetic radiation and a receiving component 88 is added to the computer 30 thereby allowing wireless startup of the computer 30. In the exemplary embodiment, the hardware key 90 has a RF transmitter and a trigger button which transmits its unique RF signal upon pressing the button. The RF receiving component 88, connected to the computer 30, will receive the RF signal and instruct the computer 30 to begin the boot-up operation. The foregoing feature, which is similar to devices used in remote entry and alarm for automobiles, can be easily understood and implemented by someone reasonably skilled in the art.

The RF receiving component 88 can be implemented in two alternative ways. In one embodiment, it physically extends the printer port or the parallel port 40 of the computer 30 using a pass-through circuit. In addition, it houses a RF receiver with a ROM chip containing the instructions for booting up the computer 30. Hence, a user can boot up the computer 30 by either using the RF transmitter on the hardware key 90 or physically connecting the hardware key 90 to the extended printer port or parallel port 86.

In a second embodiment, the receiving component is a PCMCIA card with a RF receiver 92. This card 92 is connected to an available PCMCIA port (standard port on most mobile laptop computers) and houses a RF receiver and a ROM chip containing instructions for booting up the computer 30. Similarly, a user can boot up the computer 30 by either using the RF transmitter on the hardware key 90 or physically connecting the hardware key 90 to the printer port or parallel port 40.

Figure 12:
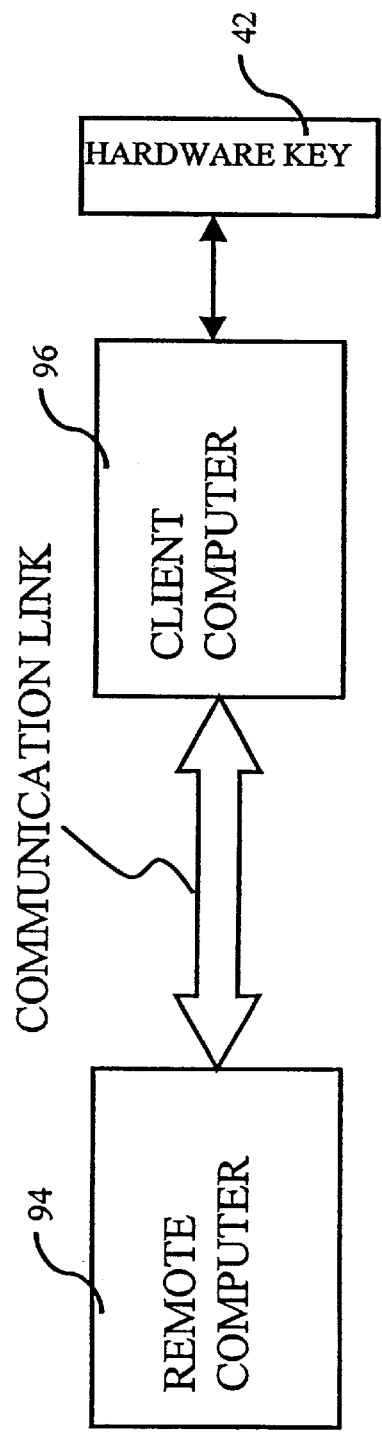
FIG. 12 is a block diagram showing the arrangement of a system according to an embodiment of the present invention which secure electronic transactions over the Internet.

According to an additional aspect of the present invention as shown in FIG. 12, the combination of the hardware key 42 and the device-driver is used to accurately identify a customer conducting electronic commerce over the Internet. Software routines are installed on the remote computer 94 hosting the Internet website. The hardware key 42 has to be connected to the parallel port 40 of the client computer 96 as long as the user is linked to the remote computer 94. When a user establishes an account for the first time, the routines communicate with the client computer 96 and retrieve certain information including the identification code from the hardware key 42. This information is linked to the particular account established and then stored on the remote computer 94 for future use.

Thereafter, whenever a person accesses a particular account, the routines check for the presence of a valid hardware key 42 in the parallel port 40 of the client computer 96. If the hardware key 42 is valid, the user is then permitted to access the particular account and conduct transactions at that website. The device-driver for this aspect of the invention is implemented in the form of an ActiveX control, which is operable on Windows 95 (or higher) and Windows NT 4.0 (or higher) platforms. ActiveX control is a software-based device which conforms to the set of specifications established by Microsoft Corporation.

Figure 13:
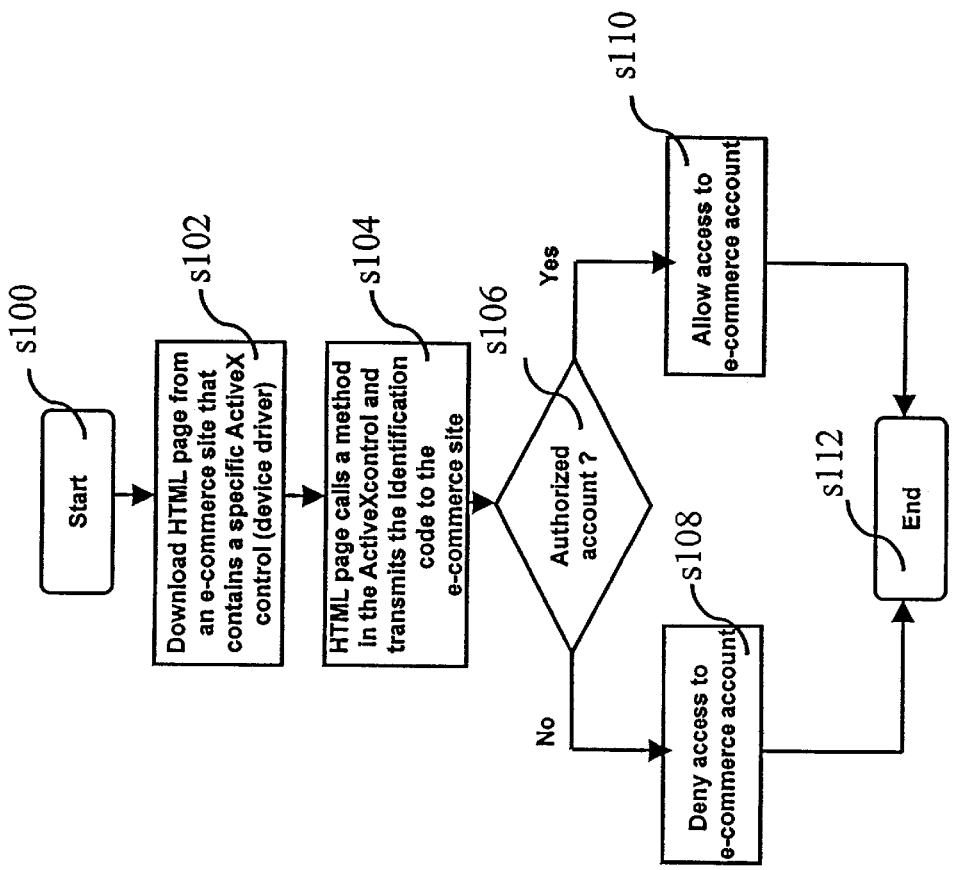
FIG. 13 is a flowchart explaining the use of the present invention to secure electronic transactions over the Internet.

The primary role of the device-driver under this implementation is to query the parallel port 40 and retrieve the identification code (corresponding to the contents of the data and control registers of the parallel port 40). FIG. 13 is a flowchart for explaining the operation of this additional aspect of the present invention. When an individual is logged onto the login page of a participating website, an HTML page is automatically downloaded to the client computer (S102). This HTML page contains a reference to the ActiveX control which resides on the remote computer 94 running the website. If the individual is accessing the website for the first time, the code within the HTML page installs and registers the ActiveX control on the client computer 96.

Thereafter, and each time the individual returns to this website, the code within the HTML page executes a method on this ActiveX control which returns to the remote computer 94 the identification code of the hardware key 42 which is connected to the parallel port 40 of the client computer 96 (S104). This identification code identifies a specific user and his account, thus resulting in the user being automatically logged onto his personal account (S106 & S110). Hence with the aid of the hardware key 42, there is no longer a need to memorize any password thereby further eliminating the possibility of unauthorized access to an account.

While the present invention has been described in connection with what is considered to be the most preferred embodiments, it is to be understood that the present invention is not limited to the disclosed embodiments but is intended to cover various arrangements included within the spirit and scope of the broadest interpretation so as to encompass all such modifications and equivalent arrangements.

What is claimed is:

1. A data and access protection system for controlling access to a computer during a boot-up operation on the basis of availability of an external device, comprising:
    (a) a non-volatile memory for storing an access control routine and a first access code;
    (b) a hardware key having a second access code, said hardware key being a multi-pin connector having a plurality of grounding and non-grounding connection pins wherein at least some of said grounding connection pins are electrically connected to at least some of said non-grounding connection pins in a preselected configuration that encodes said second access code in said multi-pin connector;
    (c) means for communicating with and receiving the second access code from the hardware key, said communicating and receiving means including a port of a computer having a plurality of storage registers with bits which are set to match said second access code encoded in said multi-pin connector in response to communication of said multi-pin connector with said port;
    (d) means for receiving said second access code from said storage registers of said port and for comparing the first access code and the second access code;
    (e) means for altering a partition entry table stored in the computer; and
    (f) means for disabling the computer when the first access code does not match the second access code.

2. A system according to claim 1, wherein the hardware key is compact and portable.

3. A system according to claim 2, wherein the hardware key may be adapted for carrying on a key chain.

4. A system according to claim 1 wherein said communicating and receiving means includes a connecting means for detachably connecting the hardware key to said port of the computer.

5. A system according to claim 4, wherein the connecting means comprises a parallel port, a printer port, a serial port, a mouse port, or a joystick port of the computer.

6. A system according to claim 1 wherein said communicating and receiving means includes a transmitting means for transmitting the second access code to said port of the computer.

7. A system according to claim 6, wherein the transmitting means comprises a RF transmitter.

8. A system according to claim 7, wherein the means for communicating and receiving the second access code comprises a RF receiver and a ROM chip containing instructions for booting up the computer.

9. A system according to claim 7, wherein the means for communicating and receiving the second access code comprises a PCMCIA card with a RF receiver, said card further including a ROM chip containing instructions for booting up the computer.

10. A data and access protection system for controlling access to a computer during a boot-up operation, comprising:
    (a) first storing means for storing an access control routine;
    (b) second storing means for storing a first identification code;
    (c) means for executing the access control routine after the computer is powered on;
    (d) a hardware key having a second identification code, said hardware key being a multi-pin connector having a plurality of grounding and non-grounding connection pins wherein at least some of said grounding connection pins are electrically connected to at least some of said non-grounding connection pins in a preselected configuration that encodes said second identification code in said multi-pin connector;
    (e) connecting means for detachably connecting the hardware key to the computer, said connecting means including a port of a computer having a plurality of storage registers with bits which are set to match said second identification code encoded in said multi-pin connector in response to the connecting of the hardware key to said port;
    (f) detecting means for detecting whether the hardware key is connected to the computer;
    (g) means for generating a first status signal if the detecting means detects that the hardware key is connected to the computer and a second status signal if the detecting means detects that the hardware key is not connected to the computer;
    (h) means for halting the boot-up operation of the computer if the second status signal is generated;
    (i) means for retrieving the second identification code from the hardware key in response to the generation of the first status signal;

(j) means for comparing the second identification code with the first identification code to determine if there is a match between the second identification code and the first identification code;

(k) means for altering a partition entry table stored in the computer thereby rendering impossible any boot-up operation using an external boot disk; and (l) means for halting the boot-up operation of the computer if there is no match between the second identification number and the first identification number.

11. A system according to claim 10, wherein the first storing means and the second storing means consist essentially of a non-volatile memory.

12. A system according to claim 10, wherein the connecting means comprises a parallel port, a printer port, a serial port, a mouse port, or a joystick port of the computer.

13. A system according to claim 10, wherein the hardware key is compact and portable.

14. A system according to claim 13, wherein the hardware key may be adapted for carrying on a key chain.

15. A data and access protection system for controlling a boot-up operation of a computer, comprising:

(a) a first storing means for storing an access control routine;

(b) a second storing means for storing a first identification code;

(c) means for executing the access control routine after the computer is powered on;

(d) a hardware key having a second identification code, said hardware key being a multi-pin connector having a plurality of grounding and non-grounding connection pins wherein at least some of said grounding connection pins are electrically connected to at least some of said non-grounding connection pins in a preselected configuration that encodes said second identification code in said multi-pin connector;

(e) means for communicating with and receiving the second identification code from the hardware key, said communicating and receiving means including a port of a computer having a plurality of storage registers with bits which are set to match said second access code encoded in said multi-pin connector in response to communication of said multi-pin connector with said port;

(f) means for comparing the second identification code with the first identification code to determine if there is a match between the second identification code and the first identification code;

(g) means for altering a partition entry table stored in the computer thereby rendering impossible any boot-up operation using an external boot disk; and (h) means for halting the boot-up operation of the computer if there is no match between the second identification code and the first identification code.

16. A system according to claim 15, wherein the hardware key is compact and portable.

17. A system according to claim 16, wherein the hardware key may be adapted for carrying on a key chain.

18. A system according to claim 15, wherein the communicating and receiving means comprises a RF transmitter.

19. A system according to claim 18, wherein the means for communicating and receiving the second identification code comprises a RF receiver and a ROM chip containing instructions for booting up the computer.

20. A system according to claim 18, wherein the means for receiving the second identification code comprises a PCM-CIA card with a RF receiver, said card further including a ROM chip containing instructions for booting up the computer.

21. An access protection system for controlling and securing access to electronic transactions conducted over the Internet, comprising:

(a) a first access routine residing on a first computer;

(b) means for transferring a second access control routine from the first computer onto a second computer;

(c) means for storing a first identification code on the first computer;

(d) a hardware key having a second identification code, said hardware key being a multi-pin connector having a plurality of grounding and non-grounding connection pins wherein at least some of said grounding connection pins are electrically connected to at least some of said non-grounding connection pins in a preselected configuration that encodes said second identification code in said multi-pin connector:

(e) connecting means for detachably connecting the hardware key to the second computer, said connecting means including a port of the second computer having a plurality of storage registers with bits which are set to match said second identification code encoded in said multi-pin connector in response to the connecting of the hardware key to said port;

(f) detecting means for detecting whether the hardware key is connected to the second computer;

(g) means for generating a first status signal if the detecting means detects that the hardware key is connected to the second computer and a second status signal if the detecting means detects that the hardware key is not connected to the second computer;

(g) means for denying access to the first computer if the second status signal is generated;

(h) means for retrieving the second identification code from the hardware key in response to the generation of the first status signal;

(i) means for comparing the second identification code with the first identification code to determine if there is a match between the second identification code and the first identification code; and (j) means for denying access to the first computer if there is no match between the second identification code and the first identification code.

22. A system according to claim 21 wherein the hardware key is compact and portable.

23. A system according to claim 22 wherein the hardware key may be adapted for carrying on a key chain.

24. An access protection system for controlling and securing access to electronic transactions conducted over the Internet, comprising:

(a) a first access routine residing on a first computer;

(b) means for transferring a second access control routine from the first computer to a second computer;

(c) means for storing a first identification code on the first computer;

(d) a hardware key being a multi-pin connector having a plurality of grounding and non-grounding connection pins wherein at least some of said grounding connection pins are electrically connected to at least some of said non-grounding connection pins in a preselected configuration that encodes said second identification code in said multi-pin connector;

(e) means for connecting the hardware key to the second computer, said connecting means including a port of the second computer having a plurality of storage registers with bits which are set to match said second identification code encoded in said multi-pin connector in response to the connecting of the hardware key to said port;

(f) means for retrieving the second identification to the first computer;

(g) means for determining whether the first identification code matches the second identification code; and (h) means for denying access to the first computer if there is no match between the first identification code and the second identification code.

* * * * *